United States Patent [19]
Dedolph

[11] 3,911,619
[45] Oct. 14, 1975

[54] SEED SPROUTER AND INSERT THEREFOR
[75] Inventor: Richard R. Dedolph, Naperville, Ill.
[73] Assignee: Gravi-Mechanics Co., Naperville, Ill.
[22] Filed: July 26, 1974
[21] Appl. No.: 492,174

[52] U.S. Cl. .................. 47/14; 195/131; 51/164; 47/56; 47/1.2; 47/58
[51] Int. Cl.² .................. A01G 31/02; A01C 1/02
[58] Field of Search ............... 51/163–164; 195/129–131; 47/14, 16, 56, 58, 1.2

[56] References Cited
UNITED STATES PATENTS

| | | |
|---|---|---|
| 794,756 | 7/1905 | Van Bruggen .................. 47/14 |
| 1,637,250 | 7/1927 | Ashing .......................... 47/14 |
| 1,724,949 | 8/1929 | Markey et al. .................. 47/14 |
| 1,865,680 | 7/1932 | Dax .......................... 195/131 X |
| 3,013,776 | 12/1961 | Patterson .................. 51/164 X |
| 3,765,131 | 10/1973 | Christensen .................. 51/164 |

OTHER PUBLICATIONS
Geotropism in simulated low-gravity environments, Dedolph et al., Amer. Journ. of Botany, 530–533, 1966.
Gravity and Plant Development, Gordon, Space Biology, O.S.U. 1963, pp. 75–101.

Primary Examiner—Robert E. Bagwill
Attorney, Agent, or Firm—Prangley, Dithmar, Vogel, Sandler & Stotland

[57] ABSTRACT

A seed sprouter including a frame having carrier structure mounted thereon for holding seeds a predetermined distance from and for turning about a horizontal axis, a motor mounted on the frame for driving the carrier structure to turn the carrier structure about the horizontal axis at a speed to nullify the effects of gravity on the growth of the seeds carried thereby, and an annular trough for the carrier structure for holding a body of water through which the seeds are passed as the carrier structure turns about the horizontal axis, whereby the seeds are alternately watered and aerated as the carrier structure turns; there also is provided a seed carrier insert and an assembly of the insert with seeds and a water-soluble sheet to retain the seeds in the insert.

15 Claims, 12 Drawing Figures

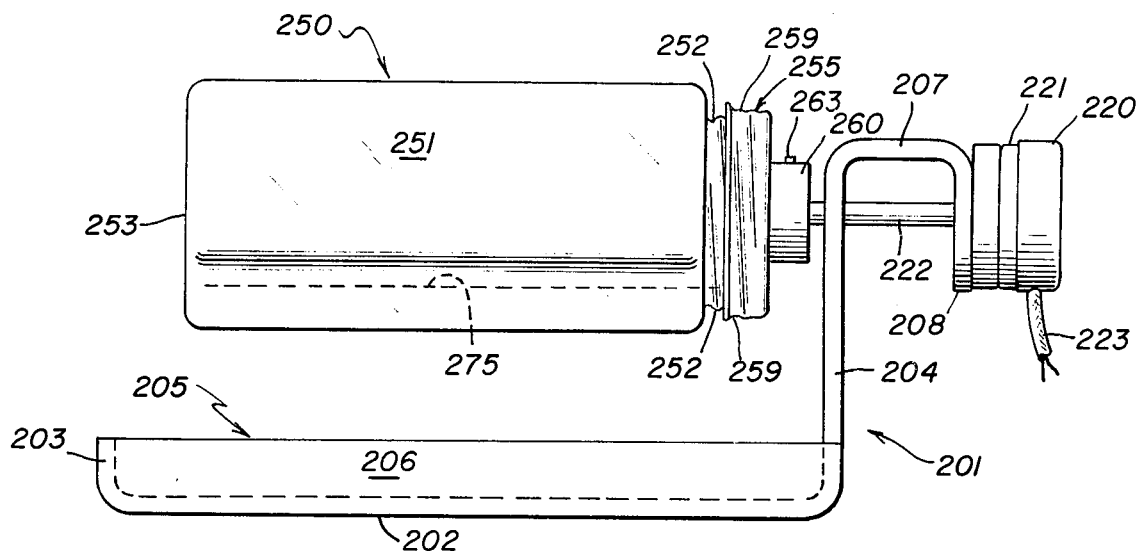
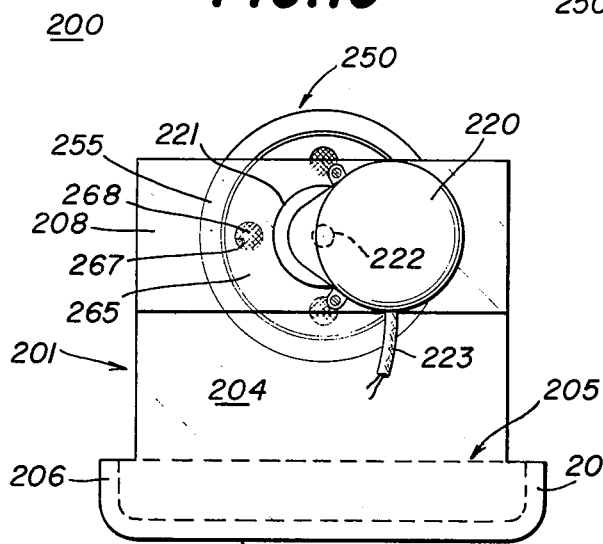
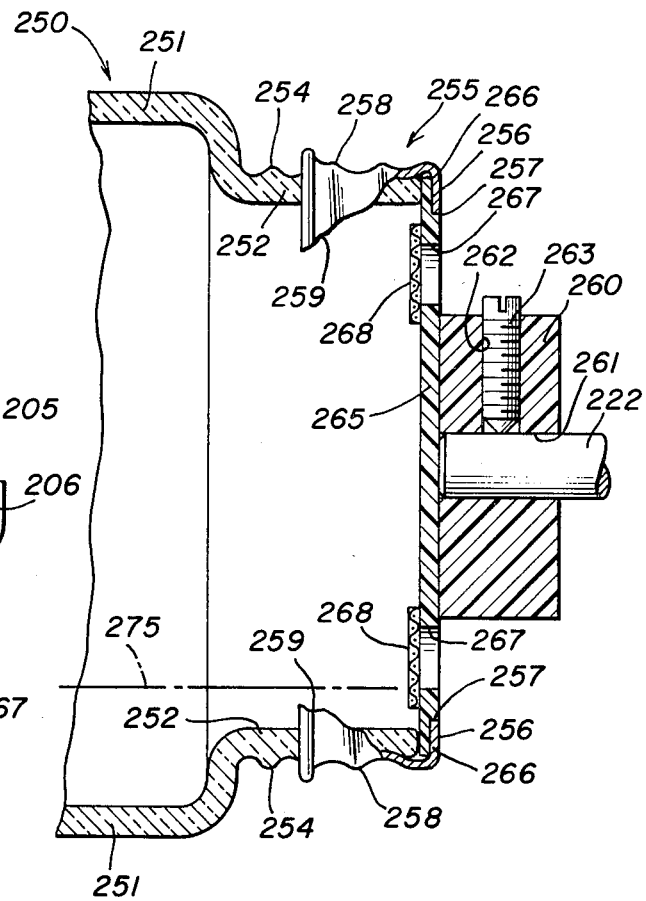
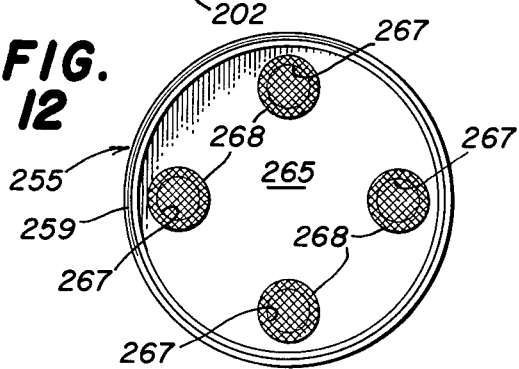

SEED SPROUTER AND INSERT THEREFOR

BACKGROUND OF THE INVENTION

The present invention relates generally to improvements in seed sprouters, and specifically to the provision of seed sprouters wherein the seeds are grown under conditions nullifying the effects of gravity on the growth thereof and wherein the seeds are alternately watered and aerated automatically.

Standard sprouting practice heretofore has sprouted the seeds under high humidity conditions in a fixed or stationary container. These prior systems demanded constant attention and specifically were normally watered at least twice a day. The sprouting of the seeds and the growth of the resultant sprouts was often accompanied by the growth of molds and was attended by disagreeable odors. A lack of aeration also often resulted in a physiologically diseased condition of the sprouts.

SUMMARY OF THE INVENTION

The present invention provides a seed sprouter wherein the metabolic rate of the seeds and sprouts is increased, causing the sprouts to grow faster, due to the nullification of the effects of gravity on the growth thereof, all while accompanied by automatic watering and aeration, thus to produce healthier sprouts with no attendant odor, disease or molds, attention to watering by the operator being only once a day or even every other day or even less frequently.

This is accomplished in the present invention, and it is an object of the present invention to accomplish these desired results, by providing a seed sprouter that includes a frame, a carrier mounted on the frame for holding seeds a predetermined distance from and for turning about a horizontal axis, a motor mounted on the frame for driving the carrier structure to turn the carrier structure about the horizontal axis at a speed to nullify the effects of gravity on the growth of sprouts from the seeds carried thereby, and an annular trough for the carrier structure for holding a body of water through which the seeds are passed as the carrier structure turns about the horizontal axis, whereby the seeds are alternately watered and aerated as the carrier structure turns.

In connection with the foregoing object, it is another object of the invention to provide a seed sprouter wherein the carrier structure holds the seeds a distance of from about 1 and ½ inches to about 2½ inches from the horizontal axis, and the motor turns the carrier structure at a rate from about 1 revolution per five minutes to about 5 revolutions per minute.

It is another object of the invention to provide a seed sprouter of the type set forth wherein the annular trough is constructed and arranged so that the seeds are immersed in water from about ⅛ to about 1/6 of each revolution of the carrier structure, an enclosure being optionally provided for the carrier structure and the annular trough to maintain a high humidity environment thereabout.

Yet another object of the invention is to provide a seed sprouter of the type set forth wherein the carrier structure is disposed within a container and the annular trough is also disposed within the container, the container in a preferred example being annular in cross section and closed at one end and having a removable cap closing the other end, the removable cap having an opening therein spaced inwardly from the inner periphery of the container, whereby the container and the cap provide an annular trough and the opening in the cap determines the level of the water in the annular trough.

Still another object of the invention is to provide a seed sprouter of the type set forth having two shafts rotating in the same direction and mounting a container for holding the carrier structure therein.

Yet another object of the invention is to provide a seed sprouter of the type set forth wherein the container is held in cantilever fashion.

Still another object of the invention is to provide a seed carrier insert for holding seeds around the inner periphery of a container during germination and sprouting of the seeds, the insert comprising a sheet of flexible material having a plurality of seed-receiving troughs therein.

A further object of the invention is to provide a seed carrier insert assembly including an insert with seed-receiving troughs having seeds disposed therein and a water soluble sheet holding the seeds in the troughs until exposure to water within a seed germinator.

Further features of the invention pertain to the particular arrangement of the parts of the seed sprouter, the seed carrier insert and the seed carrier insert assembly, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 9 is a side elevational view of a second embodiment of a seed sprouter made in accordance with and embodying the principles of the present invention;

FIG. 10 is an end view as viewed from the right of the seed sprouter of FIG. 9;

FIG. 11 is an enlarged view in vertical longitudinal section through the cap end of a container showing the connection thereof to the drive shaft;

FIG. 12 is a view of the inner side of the cap of FIG. 11 and further illustrating the opening therein.

DESCRIPTION OF THE PREFERRED EMBODIMENT

Figure 1:
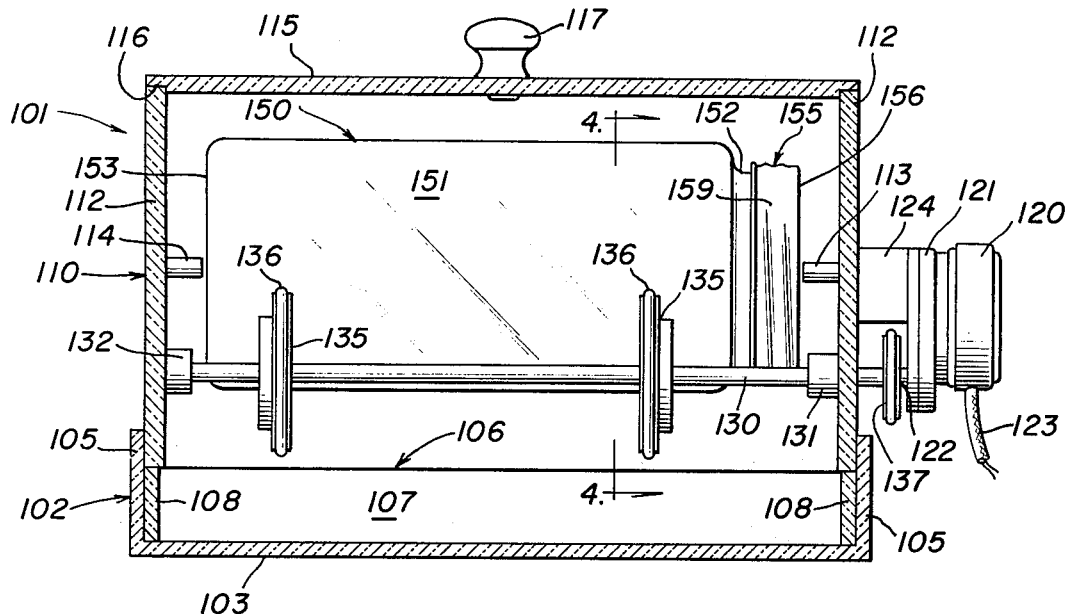
FIG. 1 is a side elevational view with the near side broken away of a first embodiment of a seed sprouter made in accordance with and embodying the principles of the present invention.
Figure 2:
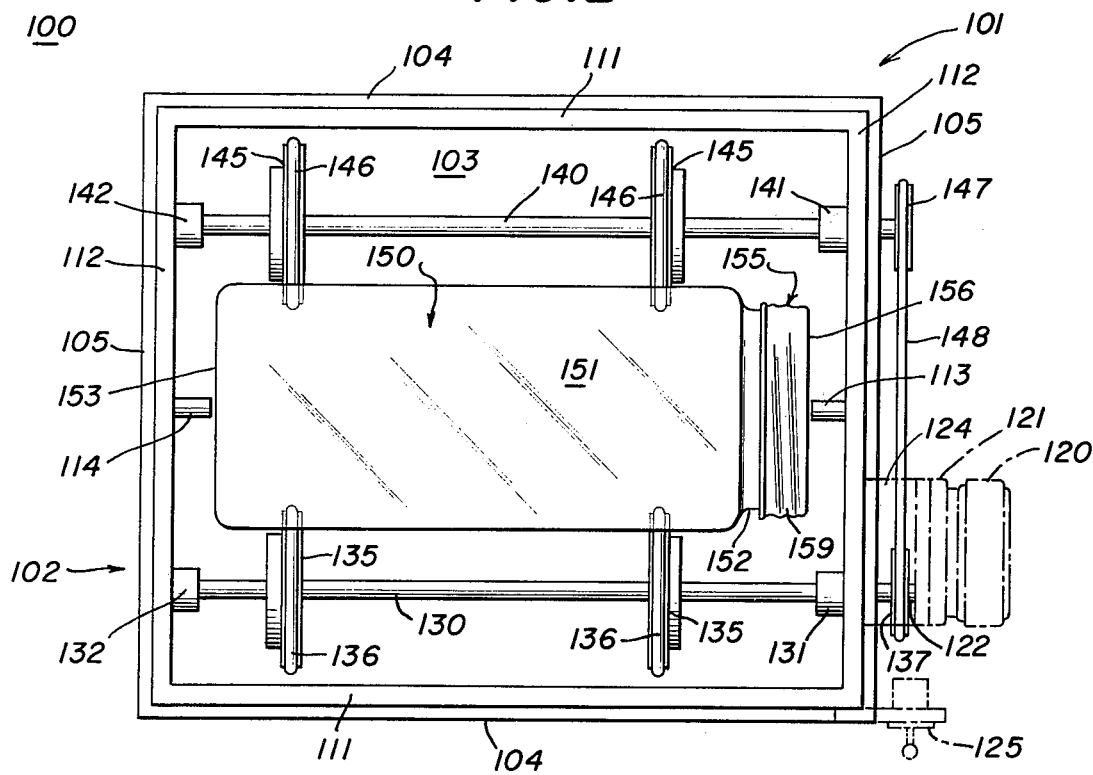
FIG. 2 is a plan view of the seed sprouter of FIG. 1 with the cover removed.
Figure 3:
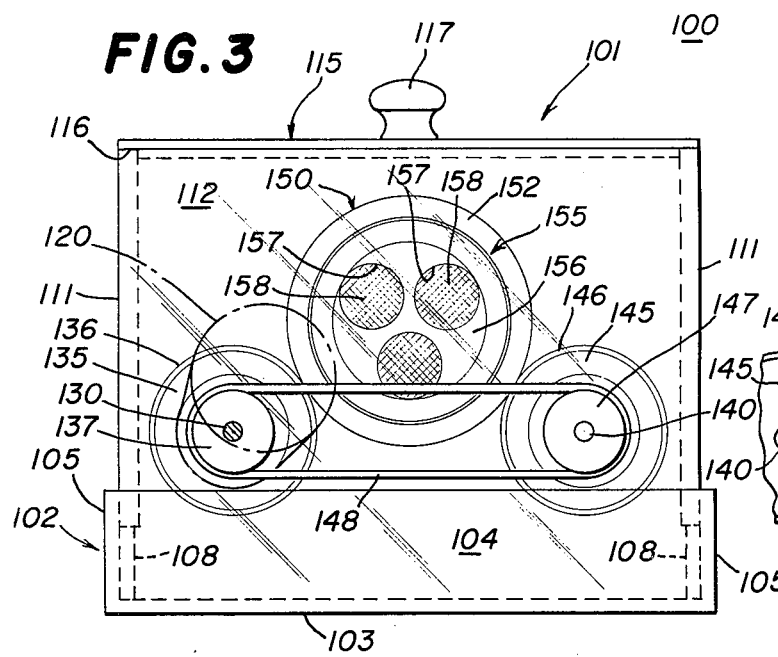
FIG. 3 is an end view of the seed sprouter of FIG. 1 as seen from the motor carrying end, the motor being shown in phantom for illustrative purposes.

Referring first to FIGS. 1 to 4 of the drawings, there is illustrated a first preferred embodiment of a seed sprouter generally designated by the numeral 100. The seed sprouter 100 comprises a housing 101 that further includes a base 102 supporting a frame 110 enclosed by a cover 115. The bast 102 has a bottom 103 generally rectangular in shape and extending upwardly from the edges thereof a pair of opposed side walls 104 and a pair of opposed end walls 105 that form a drip pan for collecting water as will be described more fully hereinafter. There is provided within the base 102 a ledge generally designated by the numeral 106 on which sits the frame 110. The ledge 106 is formed by a pair of parallel side members 107 disposed within the side walls 104 and a pair of opposed end members 108 disposed within the end walls 105.

As illustrated, the frame 110 fits within the base 102 and rests upon the ledge 106 and includes a pair of parallel side walls 111 joined by parallel end walls 112. The upper open end of the frame 110 is closed by a cover 115 that is rectangular in shape and overlies the frame 110 and is provided with a recess 116 extending around the periphery thereof so as to center the cover 115 upon the frame 110. A handle 117 is conveniently provided in the center of the cover 115.

As illustrated in the drawings, each of the members of the housing 101 including the base 102, the frame 110 and the cover 115 is formed of a transparent material, the preferred material being a synthetic organic plastic resin, the preferred resin being an acrylic resin such as a methyl methacrylate resin.

Mounted on one of the end walls 112 by means of a mounting block 104 is an electric drive motor 120, the drive motor 120 in turn driving a gear reducer 121 having an output shaft 122. The electric motor 120 is connected by a pair of conductors 123 to a switch 125 that is also mounted upon the wall 112, the switch 125 having the input contacts thereof connected to a cord (not shown) adapted to be connected to the usual household electrical outlet.

Mounted within the frame 110 is a first shaft 130 and a second shaft 140. The first shaft 130 is disposed in bearings 131 and 132 that are mounted in the opposed end walls 112. Mounted intermediate the ends of the shaft 130 are two wheels 135 that are spaced apart longitudinally and are suitably secured to the shaft 130, such as by set screws (not shown). Each of the wheels 135 in turn is provided with a tire 136 that provides a smooth, yet resilient driving surface to drive an associated container 150 disposed thereon.

The shaft 140 likewise is supported in bearings 141 and 142 mounted respectively in the opposed end walls 112 and carries intermediate the ends thereof two wheels 145 secured thereto as by set screws (not shown). Each of the wheels 145 is provided with a tire 146 that is preferably resilient to provide a smooth, yet resilient driving surface for the associated container 150.

The shaft 122 from the gear reducer 121 is directly connected to the shaft 130 and also carries a pulley 137 secured thereto as by a set screw (not shown). A pulley 147 is provided on an extension of the shaft 140, a drive belt 148 interconnecting the pulleys 137 and 147. By this arrangement, the motor 120 simultaneously drives the shafts 130 and 140 in the same direction as is diagrammatically illustrated in FIG. 4, the shaft 130 being driven in the direction of the arrow 134 (in the clockwise direction) and the shaft 140 is driven in the direction of the arrow 134 (also in the clockwise direction).

Figure 4:
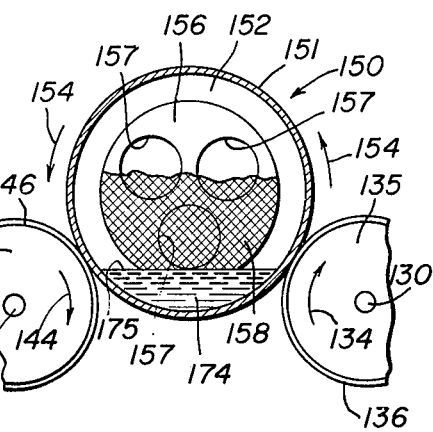
FIG. 4 is a fragmentary view in cross section along the line 4—4 of FIG. 1.

Disposed upon and driven by the wheels 135 and 145 is the container 150 which is preferably in the form of a glass bottle having a Mason-jar type closure. As illustrated, the container 150 has a cylindrical side wall 151 carrying a reduced neck 152 on one end thereof and being closed at the other end thereof by an end wall 153. The wheels 135 and 145 when rotated as illustrated in FIG. 4 serve to rotate the container 150 in the direction of the arrow 154 (in a counter clockwise direction) and with the longitudinal axis of the container 150 disposed horizontally, whereby the container 150 rotates about a horizontal axis, which horizontal axis is also the axis of container 150 as illustrated.

The neck of the container 150 carries the usual thread to receive a threaded cap 155, the cap 155 having a top 156 with three holes 157 therein, the holes 157 being covered by a screen 158 disposed internally of the cap 155. The cap 155 also has a side wall 159 that carries thereon threads that mate with the threads on the neck 152, thus threadedly to interconnect the cap 155 and the bottle 150. In order properly to position the bottle 150 between the frame end walls 112, two abutments 113 and 114 are provided generally along the axis of the container 150, the abutment 113 being positioned to contact the cap 155 if required, while the abutment 114 is adapted to contact the end wall 153 of the container 150, if required.

The seed sprouter 100 thus illustrated in FIGS. 1 to 4 can be used as shown to germinate and sprout small irregular seeds such as alfalfa seeds without any further structure being added thereto. In germinating alfalfa seeds, a suitable quantity of the alfalfa seed, such as one tablespoon or about 10 grams, is placed in the container 150 and the container filled approximately half full or tepid water. The alfalfa seeds are permitted to stand in the water without rotation and outside of the seed germinator 100 over night in order to dissolve therefrom naturally occuring chemicals which prevent premature sprouting during storage and transit.

After the seeds have stood over night in water, the cap 155 is applied to the container 150 and the container 150 is positioned in the seed sprouter 100 as illustrated in FIGS. 1 to 4. It will be appreciated that the excess water in the container 150 will drain out through the openings 157 and through the screen 158 disposed in front thereof until the water level reaches that illustrated in FIG. 4, i. e., until a pool of water 174 is formed at the level 175 determined by position of openings 157. Actually, the side wall 151, the end wall 153 and the portions of the cap 155 disposed radially outwardly with respect to the openings 157 provide an annular trough to hold the pool 174 of water.

The switch 125 is connected to a source of household electricity, after which the switch 125 is turned to the "on" position thus energizing the motor 120. The parts begin to rotate as illustrated in FIG. 4 by the arrows 134, 144 and 154. Because of the light weight, small size and irregular shape of the alfalfa seed, it will cling to the inner surface of the side wall 151 on a film of water carried thereby, so that the alfalfa seeds will distribute themselves around the side wall 151, essentially covering the same. As the container 150 is rotated, the alfalfa seeds will be passed through the pool 174 of water and then out of the pool 174 and upwardly to be aerated while traveling around above the surface 175 of the pool 174 until again carried thereinto by the rotation of the container 150.

It has been found that the water in the pool 174 need be replenished only daily, or even only every other day, in order to maintain the proper and required amount of water within the container 150 to achieve proper sprouting of the alfalfa seeds and the growth of the resultant sprouts. It will be appreciated that the provision of the base 102 together with the imperforate side walls of the frame 110 and the cover 115 maintains a high humidity condition around the container 150. Meanwhile, the openings 157 and the screen 158 permit ready flow of air between the interior of the container 150 and the interior of the sprouter housing 101, and even into the surrounding atmosphere when the cover 115 is removed. As a consequence, the seeds and sprouts are automatically periodically watered and aerated as the container 150 is rotated by the wheels 135 and 145. The automatic sequential watering and aerating serves several functions. First of all, there will be no disease problem due to the constant aeration of the seeds and the sprouts, whereby there will be provided physiologically healthier sprouts. There will be no mold formation and no disagreeable odor formed in the seed sprouter 100. It is pointed out that the container 150 and the cap 155 can both be quickly and easily sterilized between uses, thus further to discourage unwanted growths therein.

In a constructional example of the seed sprouter 100, the container 150 has a diameter of from 3 inches to 5 inches, whereby the seeds and sprouts on the inner surfaces of the side wall 151 rotate about an axis at a distance from about 1½ inches to about 2½ inches therefrom. It has been found that if the container 150 is rotated at a rate of from about 1 revolution per 5 minutes to about 5 revolutions per minute, the effects of gravity upon the growth of the sprouts within the container 150 are essentially nullified. As a result, the sprouts grow faster than they do in a stationary sprouter, alfalfa sprouts, for example, growing to full maturity within 3 days rather than the normal 5 days required if grown in a stationary condition.

For a more full explanation of the use of rotation of plants to nullify the effect of gravity on the growth thereof, reference is made to the applicant's co-pending application for U.S. Letter Patent, Ser. No. 428,995, filed Dec. 27, 1973 for ROTARY PLANT GROWTH ACCELERATING APPARATUS, and applicant's co-pending application for U.S. Letters Patent, Ser. No. 474,269, Filed May 29, 1974, For PLANT GROWTH ACCELERATING APPARATUS; the disclosures of these prior applications are incorporated herein by reference. Reference also is made to the article by R. R. Dedolph, et al. entitled "Causal Basis of Gravity Stimulus Nullification By Clinostat Rotation", *Plant Physiology*, Vol. 42, No. 10, Oct. 1967, pp. 1373–1383.

The outermost portions of the holes 157 are disposed inwardly with respect to the inner surface of the side walls 151 a distance such that the pool 174 of water occupies and covers from about ⅛ to about 1/6 of the inner periphery of the side wall 151. As a result, the seeds and sprouts are automatically watered and then aerated as the container 150 is turned by operation of the motor 120. Periodical watering of the seeds and the sprouts is essential, since the sprouts at maturity comprise approximately 95% water by weight. Periodical aeration of the seeds and the sprouts is essential for the proper development thereof and also provide physiologically healthier sprouts with no disease, molds or odor.

Figure 6:
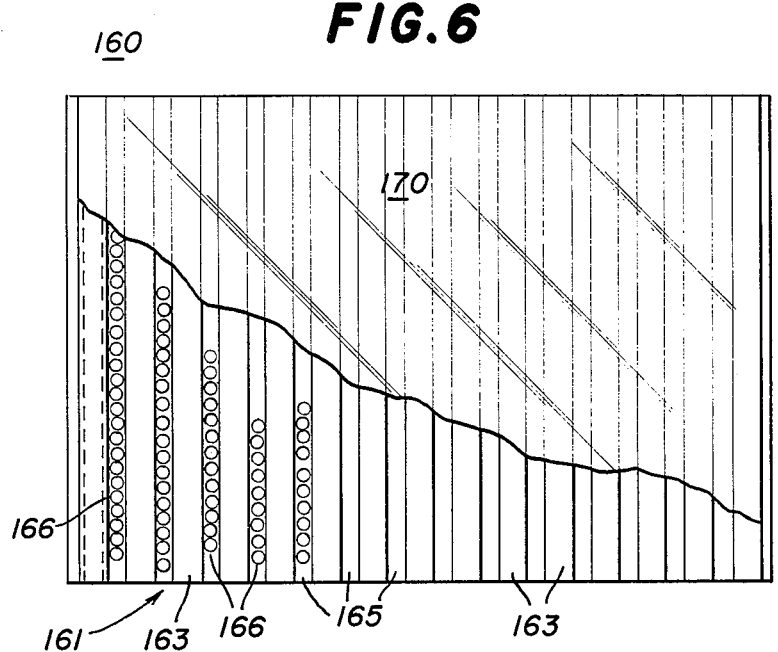
FIG. 6 is a view of the insert of FIG. 5 illustrated in its flattened condition with a portion of the inner water-soluble sheet broken away.
Figure 5:
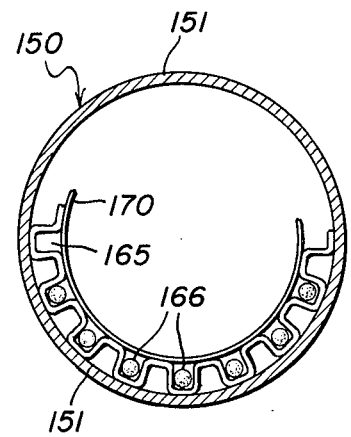
FIG. 5 is a view in section through a container for a seed sprouter with a seed carrier insert in position therein.
Figure 7:
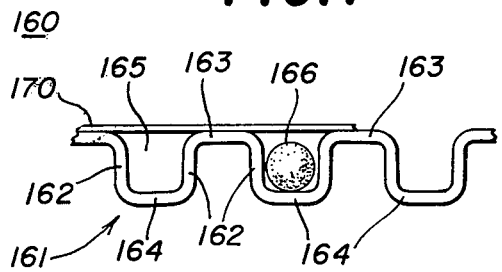
FIG. 7 is an enlarged fragmentary view in vertical section through the insert of FIG. 1.
Figure 8:
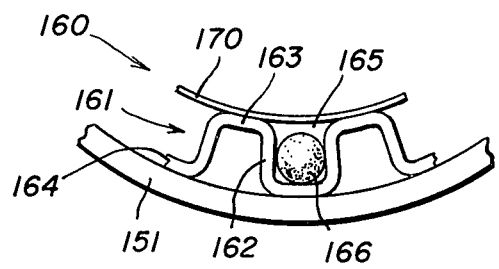
FIG. 8 is an enlarged fragmentary view in section through an insert with the insert being shown in position within a container.

When larger seeds, such as mung beans, soy beans and the like, are to be grown in the seed sprouter 100, or when round seeds such as mustard seeds are to be grown in the seed sprouter 100, it may be necessary to utilize a seed carrier to hold the seeds away from the axis of rotation of the container 150 to rotate therewith. Such a seed carrier is illustrated in FIGS. 6 to 8 of the drawings in the form of an insert 160 that can be placed within the container 150. As illustrated, the insert 160 is a continuous sheet water-insoluble material providing a body 161 that is fluted in shape. More specifically, the body 161 has radially extending walls 162 joined at the inner edges by inner walls 163 and at the outer edges by outer walls 164, all the walls cooperating to provide a series of seed-receiving troughs 165 in which are disposed the seeds 166. The troughs 165 extend longitudinally of the container 150 as is best illustrated in FIG. 5, and the length of the insert 160 is such when it is formed into a cylindrical shape and inserted through the neck 152 of the bottle 150, it thereafter so as essentially completely to cover the inner surface of the side wall 151. It will be appreciated therefore that the insert 160 must be deformable so that it can be inserted into the container 150, and further preferably has sufficient resiliency so as to spring outwardly to fit snugly against the side wall 151. A suitable material to impart such characteristics to the insert 160 for construction of the body 161 is a synthetic organic plastic resin, the preferred class of resins being the thermoplastic resin, a specific example being linear polyethylene.

If the seeds 166 are the proper size and shape with respect to the cross section of the troughs 165, the resiliency of the material of troughs 165 may be sufficient to hold the seeds 166 in place. It further is noted from FIG. 8 that when the body 161 is shaped into a cylindrical configuration, the inner edges of the radial walls 162 bend toward each other so as further to grip the seeds 166 disposed in the trough 165. As a consequence, no additional structure is required on the body 161 to hold the seeds 166 in the proper position for sprouting.

If the seeds 166 are unusually irregular in shape, or if the seeds 166 do not fit neatly within the troughs 165, then further structure may be required to hold the seeds 166 in a proper position within the troughs 165. In such cases the body 161 may be deformed to provide projections extending across or into the troughs 165 to hold the seeds 166 therein. There is illustrated in the drawings yet another method of so holding the seeds 166 in the troughs 165, that being a cover sheet 170 that is temporarily affixed to the body 161 to hold the seeds 166 within the troughs 165. After the insert 160 is in position within the container 150, the cover sheet 170 is removed. Removal of the cover sheet 170 may be manually, in which case a releasable adhesive connection is provided between the fluted body 161 and the cover sheet 170. Alternatively, the cover sheet 170 may be formed of a water-soluble resin, whereby the water in the pool 174 will serve to dissolve the cover sheet 170 to expose the seeds 166 for sprouting.

Referring to FIGS. 9 to 12 of the drawings there is shown a second preferred embodiment of a seed sprouter generally designated by the numeral 200. The seed sprouter 200 comprises a frame 201 carrying an electric motor 220 having a shaft 222 that supports a container 250 in cantilever fashion over the frame 201.

As illustrated, the frame 201 includes a bottom 202 having an integral upturned flange 203 at the left hand end therefor as viewed in FIG. 9 and having an integral upturned support wall 204 at the other end thereof. The upper end of support wall 204 carries a top flange 207 extending therefrom in a direction opposite the bottom 202, the outer edge of the top flange 207 carrying a short downturned outer flange 208 integral therewith. Side walls 206 are provided on each side of the frame 201 to cooperate with the bottom 202 and the walls 203 and 204 to provide a fluid-tight drip pan 205 disposed beneath the associated container 250.

Suitably mounted upon the outer flange 208 (such as by screws not shown) is the drive motor 220, the drive motor 220 in turn driving a gear reducer 221 having the output shaft 222 extending therefrom. The motor 220 is connected to an electrical cord 223 that is adapted to be connected to the usual household electrical outlet, thus to energize the mortor 220.

The shaft 222 passes through openings in the support wall 204 and the outer flange 208, and is also journalled therein, one end of the shaft 222 being connected to the output of the gear reducer 221 and the other end of the shaft 222 carrying the container 250 thereon, the container 250 being supported in cantilever fashion by the shaft 222 over the drip pan 205.

The container 250 is preferably in the form of a glass bottle having a Mason-jar type closure. The container 250 has a cylindrical side wall 251 carrying a reduced neck 252 at one end thereof and being closed at the other end thereof by an end wall 153. The neck 252 carries threads 254 that threadedly receive a cap 255. The cap 255 has a top 256 provided with a single large opening 257 therein and an integral side wall 259 carrying threads 258 adapted to cooperate with the threads 254 on the neck 252.

A cylindrical hub 260 is provided having an opening 261 in the center thereof to receive the adjacent end of the shaft 222. Disposed normal to the opening 261 is a threaded opening 262 receiving a screw 263 that can be threaded inwardly and against the shaft 222 removably to mount the hub 260 thereon. Fixedly secured to the hub 260 is a plate 265 that has an outer diameter such that it will just fit within the inner periphery of the cap side wall 259. A recess 266 is provided around the periphery of the plate 265 in the side disposed toward the hub 260 to receive the cap top 256 therein. Four openings 267 are also formed in the plate 265 for the purpose of passing water and air therethrough, screens 268 of fine mesh being provided and secured to the inner surface of the plate 265 and covering the openings 267 to prevent loss of small seeds through the openings 267. As illustrated, the hub 260 and the plate 265 are both formed of a synthetic organic resin, such as an acrylic resin, and are suitably joined as by solvent welding.

From the above description, it will be appreciated that the hub 260 and the plate 265 cooperate with the cap 255 to mount the container 250 in cantilever fashion upon the adjacent end of the drive shaft 222 driven by the electric motor 220, the container 250 and the contents thereof being rotated about a horizontal axis by operation of the motor 220. The holes 267 establish a water level 275 within the container 250 when water is added to the container.

The seed sprouter 200 operates in the same manner as does the seed sprouter 100 to germinate the seeds and to grow sprouts therefrom. All of the benefits described above with respect to the seed sprouter 100 are achieved using seed sprouter 200. In cases where the surrounding humidity would cause too rapid an evaporation of water from the container 250 during operation of the seed sprouter 200, the seed sprouter 200 may be placed in an enclosure, such as a box, to maintain a high level of humidity around the container 250 during operation thereof, all as explained above with respect to the seed sprouter 100.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A seed sprouter comprising a frame, support structure on said frame mounting a container for turning about a horizontal axis, carrier structure in said container for holding seeds a predetermined distance from the horizontal axis, a motor mounted on said frame for driving said support structure to turn said container and the carrier structure therein about the horizontal axis at a speed to nullify the effects of gravity on the growth of seeds carried by said carrier structure, and an annular trough in said container for holding a body of water through which the seeds are passed as said support structure turns about the horizontal axis, whereby the seeds on said carrier structure are alternately watered and aerated as said support structure turns.

2. The seed sprouter set forth in claim 1, wherein said container is generally annular in cross section and closed at one end and has a removable cap closing the other end, said removable cap having an opening therein spaced inwardly from the inner periphery of said container, whereby said container and said cap provide said annular trough with the opening in said cap determining the level of water in said annular trough.

3. The seed sprouter set forth in claim 2, and further comprising screening covering the opening in said cap to hold seeds within said container during the turning thereof and permitting exchange of air between the atmosphere and the interior of said container.

4. The seed sprouter set forth in claim 1, wherein said carrier structure is a film of water on the inner surface of said container holding small seeds thereon during the turning of said container.

5. The seed sprouter set forth in claim 1, wherein said carrier structure is a deformable insert disposed within said container and trappingly carrying thereon the seeds.

6. A seed sprouter comprising a frame, a pair of spaced apart parallel shafts mounted on said frame, a motor mounted on said frame and connected to said shafts for simultaneously driving said shafts in the same direction, a container resting on said shafts to be turned thereby about a horizontal axis, carrier structure mounted in said container for holding seeds a predetermined distance from the horizontal axis and for turning the seeds about the horizontal axis as said container is turned, and an annular trough in said container for holding a body of water through which the seeds are passed as said container and the seeds carried therein turn about the horizontal axis, said motor and said shafts and said container being constructed and arranged so as to turn said carrier structure about the horizontal axis at a speed to nullify the effects of gravity on the growth of the seeds carried thereby and alternately to water and to aerate the seeds as said container turns.

7. The seed sprouter set forth in claim 6, and further comprising wheels mounted on said shafts and drivingly supporting said container.

8. The seed sprouter set forth in claim 7, and further comprising abutments mounted on said frame and contacting said container to maintain said container centered longitudinally with respect to said wheels.

9. The seed sprouter set forth in claim 6, wherein said frame is annular in shape and open at both ends, and further comprising a base for said frame providing a drip pan and a closure for the lower end of said frame, and a cover closing the upper end of said frame so as completely to enclose said container to maintain high humidity conditions therearound and therein.

10. The sprouter set forth in claim 9, wherein said frame and said base and said cover and said container are all formed from transparent materials.

11. A seed sprouter comprising a frame including a generally horizontal base and an upstanding support wall on said base, a motor mounted on said support wall and drivingly connected to a shaft disposed with the axis thereof horizontal, a container mounted in cantilever fashion on said shaft for rotation therewith about the horizontal axis, carrier structure mounted in said container for holding seeds a predetermined distance from the horizontal axis and for turning about the horizontal axis, and an annular trough for said container for holding a body of water through which the seeds are passed as said container and the carrier structure therein are turned, said motor and said container and said carrier structure being constructed and arranged so that the seeds are turned about the horizontal axis at a speed to nullify the effects of gravity on the growth thereof and to water and to aerate the seeds alternately as said container and said carrier structure turn.

12. The seed sprouter set forth in claim 11, wherein said base provides a drip pan for receiving excess water from said annular trough.

13. The seed sprouter set forth in claim 11, wherein said container is provided with a cap closing the open end thereof and threadedly engaging therewith, a hub fixedly secured to said cap and removably secured to said shaft for releasably mounting said container on said shaft.

14. A seed carrier insert assembly for use in a container during sprouting of the seeds, said assembly comprising a sheet of water-insoluble flexible material having a plurality of seed-receiving troughs disposed longitudinally thereof, a plurality of seeds disposed in said troughs and essentially filling the same, and at least one cover sheet of flexible material releasably secured to said sheet of water-insoluble material for covering said troughs to enclose the same to hold said seeds therein, said insert assembly being deformable into a condition in a direction transverse to said troughs to be inserted into the associated container and thereafter having sufficient resiliency to spring outwardly into contact with the inner surface of the associated container, said cover sheet being removable after placement of said insert assembly in the associated container to expose said seeds with said troughs being shaped to trap said seeds therein while permitting sprouts to grow from the seeds out of said troughs into the associated container.

15. The seed carrier insert assembly set forth in claim 14, wherein said cover sheet is formed of a water-soluble material that after placement of said insert assembly in the associated container is dissolved upon contact with water in the associated container.

* * * * *